July 22, 1958 J. E. BAYHA ET AL 2,844,250
MEANS FOR TESTING ELECTRONIC CIRCUIT COMPONENTS
Filed Sept. 28, 1953 2 Sheets-Sheet 1
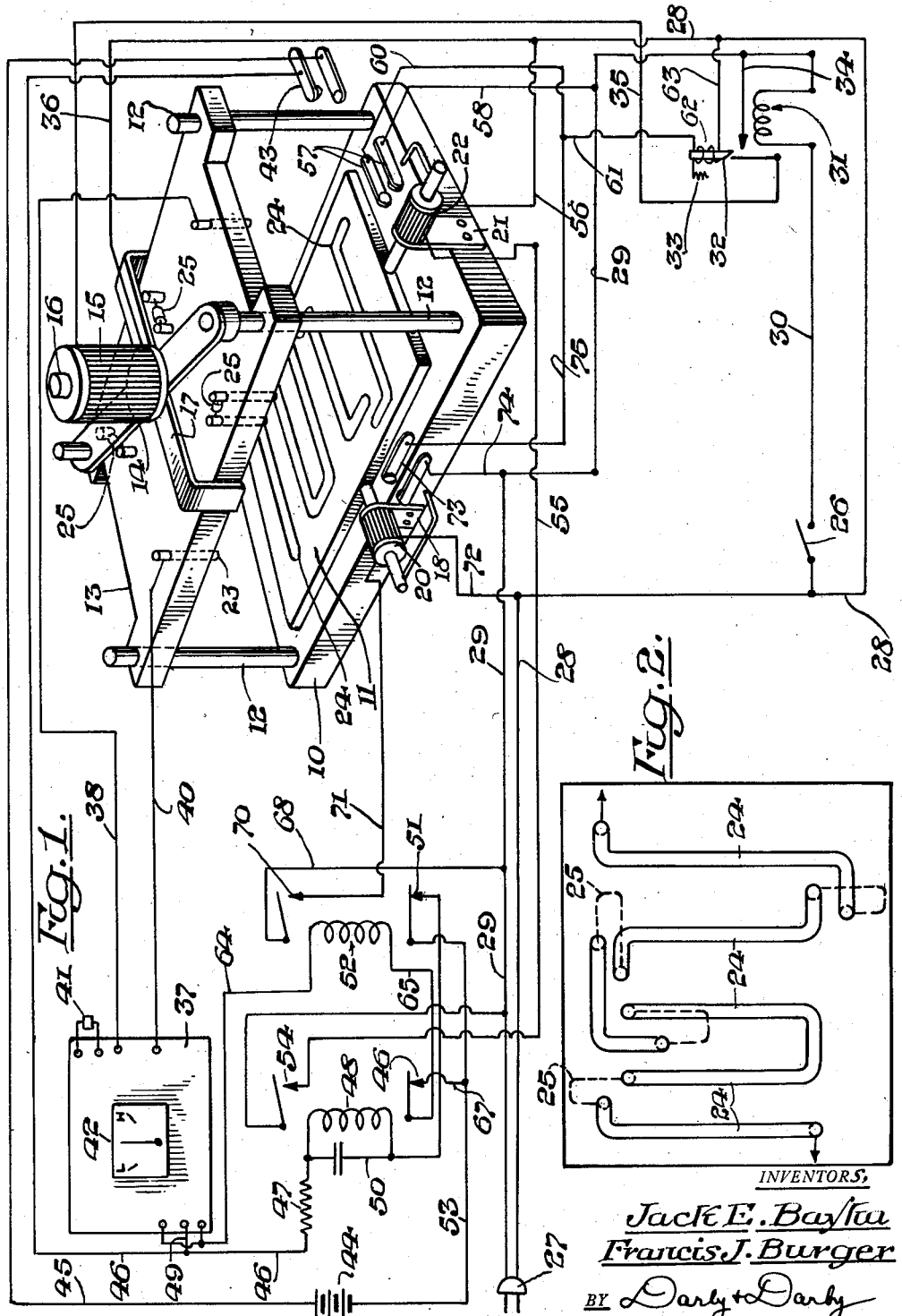
INVENTORS:
Jack E. Bayha
Francis J. Burger
BY Darby + Darby
ATTORNEYS.

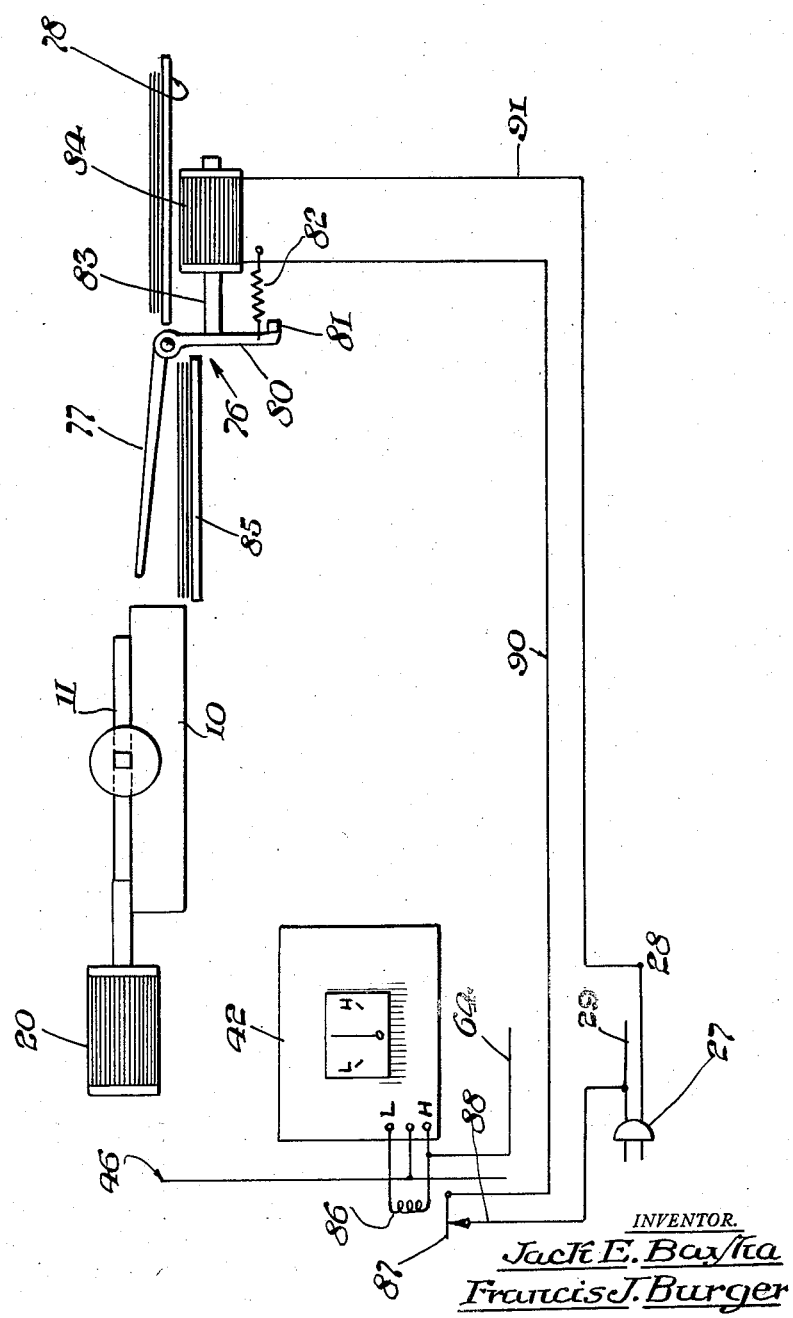

United States Patent Office 2,844,250
Patented July 22, 1958

2,844,250

MEANS FOR TESTING ELECTRONIC CIRCUIT COMPONENTS

Jack E. Bayha, South Ozone Park, N. Y., and Francis J. Burger, Leonia, N. J., assignors to Emerson Radio and Phonograph Corporation, New York, N. Y., a corporation of New York Application September 28, 1953, Serial No. 382,729

15 Claims. (Cl. 209—81)

The present invention relates to means for testing electronic circuit components and particularly to a means for testing etched, printed or stamped circuits in order to detect discontinuities therein or short circuits from one conductor to another.

More particularly still the invention comprises a means including spring contacts which are so disposed as to link together in a series arrangement all the portions of a conductor pattern which are to be inspected, the contacts being so located as to make contact with the ends of each individual conductor and the device connecting the conductors in series through impedances. Thus when there is a discontinuity in any conductor no current can flow in the circuit and if there is a short between conductors one of the series impedances will be shorted out and a bridge meter reading will indicate this fact.

It is an object of the invention to provide a device for automatically testing conductor patterns of the etched, printed or stamped circuit type.

It is another object of the invention to test such a conductor pattern both for discontinuities and for shorts between conductors.

It is a further object of the invention to provide such a device which is automatically operable to separate those printed circuit units which pass inspection from those which are imperfect.

It is a further object of the invention to provide such a device having means for separating those printed circuit units having discontinuities in conductors thereof from those having short circuits between conductors.

It is a still further object of the invention to provide such a testing device which is simple in construction and in use and which avoids the use of many indicating lights, relays and other such devices.

Other objects and features of the invention will be apparent when the following description is considered in connection with the annexed drawings, in which:

Figure 1 is a perspective view of the testing device in accordance with our invention, the view likewise showing a schematic wiring diagram of the invention;

Figure 2 is a top plan view of a typical stamped or printed circuit which the apparatus of Figure 1 is designed to test; and Figure 3 is a side elevation of the test device of Figure 1 showing a means for separating circuits which are rejected because of discontinuities from those rejected because of short circuits. This view also shows schematically the modifications of the wiring of Figure 1 necessary to accomplish the result mentioned.

Referring now to the drawings, there is shown at 10 a base on which a printed circuit such for example as that shown at 11 is adapted to rest during testing. Extending upwardly from the base 10 are the four corner posts 12 on which a test plate 13 which, like the base, is formed of suitable insulating material, is slidably mounted. Supported above the test plate 13, as for example by means of the removable strap or bracket 14, is a solenoid 15 the core 16 of which extends through the supporting strap 14 and is rigidly fixed to a saddle member 17 which is in turn fixed to the test plate 13.

Supported on a bracket 18 substantially midway of one side of the base 10 is a solenoid 20 the core of which is adapted to make contact with the circuit 11 under test. Similarly supported by bracket 21 fixed to one end of the base plate 10 is a solenoid 22, the core of which makes contact with the center of one edge of the circuit unit under test.

The test plate 13 is made up in accordance with the particular circuit to be tested, the mounting being adapted to permit change of such plates. The plate 13 comprises spring pressed contact plungers 23 which plungers are arranged in pairs one of each pair making contact with a corresponding end of a circuit conductor such as the conductors 24 of Figure 2. As will appear hereinafter a circuit extends to the first pin of the series and, when the test plate 13 has been lowered so that the contact plungers 23 make contact with the conductors 24, the circuit is extended through the first conductor to the second pin of the first pair. This second pin of the first pair is connected through a suitable impedance such as indicated at 25 to the first pin of the second pair this pattern of connection being followed until the last pin of the last pair is reached, this pin being connected to the opposite side of the circuit.

It will be clear therefore that when the circuit is complete it will extend through all of the conductors 24 under test in series and will likewise extend through all of the impedances 25. There will therefore be a definite reading on a meter or a bridge inserted in the circuit when all conductors are complete and there is no short from conductor to conductor. If, however, any conductor has a break therein there will be no current flow, and if there is a short from one conductor to another one of the impedances 25 will be removed from the circuit and the meter reading will be incorrect or the bridge, if it is used, will become unbalanced. The operation of the device as well as those elements which have not thus far been mentioned can best be described by tracing the operation of testing a circuit such as the typical circuit represented in Figure 2.

Let us assume that the circuit 11 which is in position on the base 10 awaiting test has an "open" in one of its conductors 24. In order to determine the condition of the printed circuit unit 11 the operator closes the switch 26. The closure of this switch completes a circuit from one side of the alternating current line through plug 27, conductor 28, switch 26, conductor 30 and the winding of relay 31 to conductor 29 and thence through plug 27 to the opposite side of the alternating current line.

Relay 31 operates and having operated is locked in position by a mechanical locking member 32 which moves into position to hold the relay armature against its contact, the member 32 comprising a magnetically actuated solenoid or relay member, spring urged by means of a spring 33 to its locking position. Closure of contacts of relay 31 completes a circuit extending from conductor 29 over conductor 34 through contacts of relay 31 and thence over conductor 35 to the winding of solenoid 15, through that winding and over conductor 36 to conductor 28 and the opposite side of the alternating current source.

As a result solenoid 15 is operated and the test plate 13 slides vertically on the posts 12 and the various contact plungers 23 rest against the ends of conductors 24, the plate being held in this position due to continued energization of solenoid 15 resulting from continued closure of the contacts of relay 31 the relay armature being locked in position by means of the locking member 32 already described.

If the circuit under test is correct, that is, if there are no breaks in any of the conductors 24 or short circuits between these conductors, then when the impedance of the circuit extending from bridge 37 by means of conductors 38 and 40 is balanced against the impedance of the standard 41, the bridge meter 42 will remain on center. The impedance bridge is a standard commercial item having a built-in power supply or being adapted to be plugged into a standard alternating current outlet. As a result and when the test plate 13 reaches its lowest position as has been described, and contacts 43 close, a circuit is completed from the D. C. source 44 over conductor 45, through contacts 43, thence over conductor 46, resistance 47, relay winding 48 shunted by capacitor 50, thence through contacts 51 of relay 52 and over conductor 53 to the other pole of the D. C. source 44. Due to the use of shunted capacitor 50 there will be a certain time delay before relay 48 will operate. When that relay operates the closure of its contacts 54 will complete a circuit from conductor 29 over the contacts 54 to conductor 55 and thence through solenoid 22 to conductor 56 and over conductor 28 to the opposite side of the A. C. source.

Operation of solenoid 22 causes it to eject the printed circuit unit 11 to the side of the base 10, such sidewise ejection indicating that the unit is acceptable.

Slightly in advance of this ejection, contacts 57 are closed thereby completing a circuit extending from conductor 29, conductor 58, contacts 57 and thence over conductors 60 and 61 to the winding 62 of the magnetically releasable locking member 32, thence through conductor 63 to conductor 28 and to the opposite side of the alternating current source. Locking member 32 is then operated to release the armature of relay 31 and the test plate 13 is raised to its upper position, the solenoid 15 being provided with a bias toward this upper position, for example, by spring means. Of course, the opening of contacts 43 as plate 13 rises causes the circuit through relay 48 to be opened permitting that relay to restore to its normal position.

Another printed circuit is now positioned in the position shown at 11 and the switch 26 again closed. Relay 31 operates in the same manner as indicated hereinabove and as a result the test plate 13 is lowered into position and a circuit completed from the battery through the contact plungers 23, the impedance of which is compared with the impedance of standard 41. If we assume that this new printed circuit is imperfect either because of a short or an open, then it will be clear that the indicator of bridge meter 42 will not remain on center, but will instead make contact either with the L contact or the H contact. This will, of course, occur after contacts 43 are closed due to the lowering of the test plate 13. The closure of either contact L or H of the meter 42 will cause completion of a circuit from D. C. source 44 over conductor 45, through contacts 43, over conductors 46 and 49, thence through the contacts of bridge meter 42 over conductor 64 and the winding of relay 52 and thence over conductor 65 to the now closed contact 46 of relay 48 and thence over conductors 67 and 53 to the opposite side of the D. C. source 44.

It will be noted that relay 48 will be at the same time connected in a completed circuit but since relay 48 is provided with a time delay capacitor 50 relay 52 will operate first. Operation of relay 52 will cause opening of contacts 51 and therefore prevent energization of relay 48 since contact 51 is in the energizing circuit for relay 48. Operation of relay 52 will complete a circuit extending from conductor 29 over conductor 68, contacts 70 of relay 52, conductor 71, winding of solenoid 20 to conductor 72 and thence over conductor 28 to the opposite side of the alternating current source at plug 27. Solenoid 20 will thus be operated and will cause ejection of the printed circuit 11 to the rear of base plate 10 indicating that the printed circuit unit is not acceptable.

Operation of solenoid 20 will also cause closure of contacts 73, this closure resulting in the completion of a circuit extending from conductor 29 through conductor 74, contacts 73, conductor 75, conductor 61, through the winding 62 of lock 32 and conductors 63 and 28 to the opposite side of the alternating current source. As before, energization of winding 62 will release the locking member 32 and permit the armature of relay 31 to restore to its normal open position. This will result in de-energization of solenoid 15 and raising of the test plate 13 so that another circuit 11 to be tested may be inserted in the apparatus. The test plate of course rises partially prior to the ejection operation, due to the adjustment of contacts 73.

It is sometimes desirable to separate the printed circuit units which were rejected because of discontinuities from those rejected due to short circuits. Figure 3 illustrates a means for accomplishing this result. In this figure there is shown at 10 the base of the test unit of Figure 1 having a printed circuit unit thereon. At the edge of the base 10 opposite the reject solenoid 20 there is mounted a bell crank lever 76, one arm 77 of which is formed as an inclined extension of the table 10. Thus with the bell crank in the position indicated in Figure 3 operation of solenoid 20 will cause the printed circuit unit to slide off the base 10 over the inclined portion 77 of the bell crank 76 and to be deposited on the table extension 78.

The other arm 80 of bell crank lever 76 is urged to position against the stop 81 by means of the spring 82 and is in position to be operated upon by the core 83 of the solenoid 84. As will be clear from the drawing when solenoid 84 is operated the bell crank lever is rotated in a clockwise direction and while it is held in this position a printed circuit unit which is pushed from the table by the solenoid 20 is caused to be deposited upon the table 85.

When the separating solenoid 84 is utilized in the manner described above the wiring, as shown in Figure 1, is slightly modified. Thus instead of connecting the high and low contacts of the meter of bridge 42 together, the low contact is connected through the winding of a relay 86 to the conductor 64 (which is identical to conductor 64 of Figure 1) and the high contact is connected directly to the conductor 64. As a result, when the bridge meter operates to its low contact, relay 86 is energized, whereas when it operates to its high contact the relay is not energized. The contacts 87 of relay 86 are connected in a circuit which leads from conductor 29 over conductor 88 through contacts 87 thence over conductor 90 through winding of solenoid 84 and over conductor 91 and conductor 28 to the opposite side of the A. C. source. Therefore, when the printed circuit under test has a discontinuity therein and the impedance is high, the solenoid 84 is operated and rejected printed circuit units are stacked upon the table 85.

If on the other hand, the impedance is lower than that of the standard, then relay 86 operates and consequently relay contacts 87 are opened and solenoid 84 does not operate. As a result those printed circuit units which are rejected because of short circuits between conductors pass over the inclined arm 77 of the bell crank 76 and are stacked upon the table 78.

It will of course be obvious that the circuits 11 to be tested may be fed automatically into position and that other refinements and modifications of the device may readily be made; for example, the solenoids might be replaced by hydraulic or pneumatic operating means controlled by solenoid valves.

We wish therefore to be limited not by the above description which is given solely for purposes of illustration, but on the contrary to be limited only by the claims granted to us.

What is claimed is:

1. In a device for testing printed circuits for discontinuities in conductors and short circuits between conductors, in combination, a support for printed circuit units to be tested, a panel movable toward and away from a printed circuit unit on said support, a plurality of pairs of contacts insulatingly mounted on said panel each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, said bridge being adapted to be connected to a power source, means for moving said panel to position to engage said contacts with the printed circuit conductors and means operated by said impedance bridge to indicate whether said series circuit impedance matches said standard impedance or differs therefrom.

2. In a device for testing printed circuits for discontinuities in conductors and short circuits between conductors, in combination, a support for printed circuit units to be tested, a panel movable toward and away from a printed circuit unit on said support, a plurality of contacts insulatingly mounted on said panel, each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors and manually operable means for energizing said panel moving means.

3. In a device for testing printed circuits for discontinuities in conductors and short circuits between conductors, in combination, a support for printed circuit units to be tested, a panel movable toward and away from a printed circuit unit on said support, a plurality of pairs of contacts insulatingly mounted on said panel each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors and means for locking said panel in position with said contacts engaged with the printed circuit conductor.

4. In a device for testing printed circuits for discontinuities in conductors and short circuits between conductors, in combination, a support for printed circuit units to be tested, a panel movable toward and away from a printed circuit unit on said support, a plurality of pairs of contacts insulatingly mounted on said panel, each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors, switch means operated by said impedance bridge when energized, said means including switch contacts and means for supplying an electrical signal to predetermined ones of said switch contacts as said panel contacts engage the printed circuit conductors.

5. In a device for testing printed circuits for discontinuities in conductors and short circuits between conductors, in combination, a support for printed circuit units to be tested, a panel movable toward and away from a printed circuit unit on said support, a plurality of pairs of contacts insulatingly mounted on said panel, each contact being in position to engage one end of a conductor printed circuit unit when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors, means for locking said panel in position with said contacts engaging the printed circuit conductors, switch means operated by said impedance bridge, said means including switch contacts, and means for supplying an electrical signal to predetermined ones of said switch contacts as said panel moves into said locked position.

6. A device as claimed in claim 5 characterized in that said panel moving means comprises a solenoid and said panel locking means comprises a relay, and an auxiliary coil for locking said relay in its energizing position whereby said solenoid is maintained energized under control of said locking coil.

7. In a device for testing printed circuits for discontinuities in conductors and short circuits between conductors, in combination, a support for printed circuit units to be tested, a panel movable toward and away from a printed circuit unit on said support, a plurality of pairs of contacts insulatingly mounted on said panel, each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors, switch means operated by said impedance bridge when energized, and means mounted on said support and energized by said switch means to eject a tested printed circuit unit therefrom, said means ejecting said units in two different directions depending upon whether said series circuit impedance matches said standard impedance or differs therefrom.

8. In a device for testing printed circuits for discontinuities in coductors and short circuits between conductors, in combination, a support for printed circuit units to be tested, a panel movable toward and away from a printed circuit unit on said support, a plurality of pairs of contacts insulatingly mounted on said panel, each contact being in position to engage one end of a conductor printed circuit unit when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors, an ejection means mounted on one side of said support and adapted to eject printed circuit units in the one direction therefrom, a second ejection means mounted on said support with its axis at right angles to that of said first ejection means, switch means operated by said impedance bridge when energized, means for actuating said first ejection means when said switch means remains unoperated due to said series circuit impedance matching said standard impedance and means for actuating said second ejection means when said switch means operates due to said series circuit impedance differing from said standard impedance.

9. A device as claimed in claim 8 characterized in that each said ejection means comprises a solenoid having its core in alignment with the printed circuit unit on said support.

10. In a device for testing printed circuits for discontinuities in conductors and short circuits between conductors, in combination, a support for printed circuit units to be tested, a panel movable toward and away from a printed circuit unit on said support, a plurality of pairs of contacts insulatingly mounted on said panel each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors, means for locking said panel in position with said contacts engaging the printed circuit conductors, switch means including switch contacts operated by said impedance bridge, means for completing a circuit to said switch contacts as said panel contacts engage the printed circuit conductors, means for ejecting tested printed circuit units in one direction from said support when said switch means is unoperated due to said series circuit impedance matching said standard impedance and means electrically connected to a predetermined one of said switch contacts to eject a tested printed circuit unit in a direction at right angles to said last-mentioned direction when said switch means operates due to said series circuit impedance differing from said standard impedance.

11. In a device for testing printed circuits for discontinuities in conductors and short circuits between conductors, in combination, a support for printed circuit units to be tested, a panel movable toward and away from a printed circuit unit on said support, a plurality of pairs of contacts insulatingly mounted on said panel, each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors, means for locking said panel in position with said contacts engaging the printed circuit conductors, switch means operated by said impedance bridge, means for supplying an electrical signal to said switch means as said panel contacts engage the printed circuit conductors, means for ejecting tested printed circuit units in one direction from said support when said switch means is unoperated due to said series circuit impedance matching said standard impedance, means electrically connected to a predetermined one of said switch contacts to eject a tested printed circuit unit in a direction at right angles to said last-mentioned direction when said means is operated by said impedance bridge due to said series circuit impedance differing from said standard impedance, and means for deactivating said switch means upon the operation of either of said tested printed circuit unit ejection means.

12. In a device for testing printed circuits for discontinuities in conductors and short circuits between conductors, in combination, a support for printed circuit units to be tested, a panel movable toward and away from a printed circuit unit on said support, a plurality of pairs of contacts insulatingly mounted on said panel, each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors, means for locking said panel in position with said contacts engaging the printed circuit conductors, switch means including switch contacts operated by said impedance bridge when energized, means for supplying an electrical signal to predetermined ones of said switch contacts as said panel contacts engage the printed circuit conductors, means for ejecting tested printed circuit units in one direction from said support when said switch contacts remain unoperated due to said series circuit impedance matching said standard impedance, means to eject a tested printed circuit unit in a direction at right angles to said last-mentioned direction when said switch contacts operate due to said series circuit impedance differing from said standard impedance, said switch contacts being connected to said ejection means over circuits comprising a pair of relays, one of said relay circuits having a time-delay means therein said time-delay relay being energized as said panel moves into locked position, the other said relay being energized when said switch contacts are operated by said impedance bridge due to impedance of said series impedance differing from that of said standard impedance said time-delayed relay operating said first ejection means and simultaneously defeating operation of said other relay, said other relay energizing said second ejection means and preventing actuation of said time-delayed relay.

13. In a device for testing printed circuits for discontinuities in conductors and short circuits between conductors, in combination, a support for printed circuit units to be tested, a panel movable toward and away from a printed circuit unit on said support, a plurality of contacts insulatingly mounted on said panel, each contact being in position to engage one end of a printed circuit unit conductor when the panel is in one extreme of its movement, an impedance between the second of each pair of contacts and the first of a succeeding pair forming a series circuit, an impedance bridge having a standard impedance connected as one arm thereof and said series circuit connected through the first contact of the first pair and the second contact of the last pair as another arm thereof, means for moving said panel to position to engage said contacts with the printed circuit conductors, an ejection means mounted on one side of said support and adapted to eject printed circuit units in the one direction therefrom, a second ejection means mounted on said support with its axis at right angles to that of said first ejection means, switch means activated by said impedance bridge when energized, means to actuate said first ejection means when said switch means is unoperated due to said series circuit impedance matching said standard impedance, and means actuated when said switch means is operated by said impedance bridge due to said series impedance circuit value differing from said standard impedance in a particular direction to divert printed circuit units ejected by said second ejection means along a path differing from that when said series circuit impedance differs from said standard impedance in the opposite direction and said means is unoperated.

14. A device as claimed in claim 13 characterized in that said diverting means comprises a bell crank having one arm thereof adjacent said support and a solenoid adapted to actuate the other arm thereof.

15. A device as claimed in claim 14 characterized in that said one bell crank arm is in the form of an inclined table over which printed circuit units move when ejected by said second ejection means when said diverting means is unoperated, said table lying in the path of the printed circuit units and causing them to fall in a different direction when said diverting means is operated.

References Cited in the file of this patent

UNITED STATES PATENTS

| | | |
|---|---|---|
| 1,449,078 | Whittlesey | Mar. 20, 1923 |
| 1,667,420 | Kent | Apr. 24, 1928 |
| 2,296,719 | Looney | Sept. 22, 1942 |
| 2,668,618 | Seelhoff | Feb. 9, 1954 |
| 2,707,356 | Bayha | May 3, 1955 |

UNITED STATES PATENT OFFICE

CERTIFICATE OF CORRECTION

Patent No. 2,844,250                                            July 22, 1958

Jack E. Bayha et al.

It is hereby certified that error appears in the printed specification of the above numbered patent requiring correction and that the said Letters Patent should read as corrected below.

Column 8, line 35, claim 12, for "series impedance differing" read --series impedance circuit differing--.

Signed and sealed this 7th day of October 1958.

(SEAL)
Attest:
KARL H. AXLINE
Attesting Officer

ROBERT C. WATSON
Commissioner of Patents